United States Patent
Tait

[15] 3,646,978
[45] Mar. 7, 1972

[54] VEGETABLE PROCESSING MACHINE

[72] Inventor: Thomas Tait, 3920 West Rancho Drive, Phoenix, Ariz. 85019

[22] Filed: Sept. 2, 1969

[21] Appl. No.: 854,533

[52] U.S. Cl. ............................................................. 146/83
[51] Int. Cl. ............................................................. A23n
[58] Field of Search ................................ 146/81, 83, 85, 55

[56] References Cited

UNITED STATES PATENTS

| | | | |
|---|---|---|---|
| 926,286 | 6/1909 | Petrie | 146/83 |
| 1,489,061 | 4/1924 | Brudick | 146/83 |
| 2,342,358 | 2/1944 | Minera | 146/55 |
| 3,174,520 | 3/1965 | Van der Vijver | 146/83 |

Primary Examiner—Willie G. Abercrombie
Attorney—Willard L. Groene

[57] ABSTRACT

A vegetable processing machine for cleaning, trimming off the tops and roots, and bagging of vegetables such as onions and the like.

3 Claims, 6 Drawing Figures

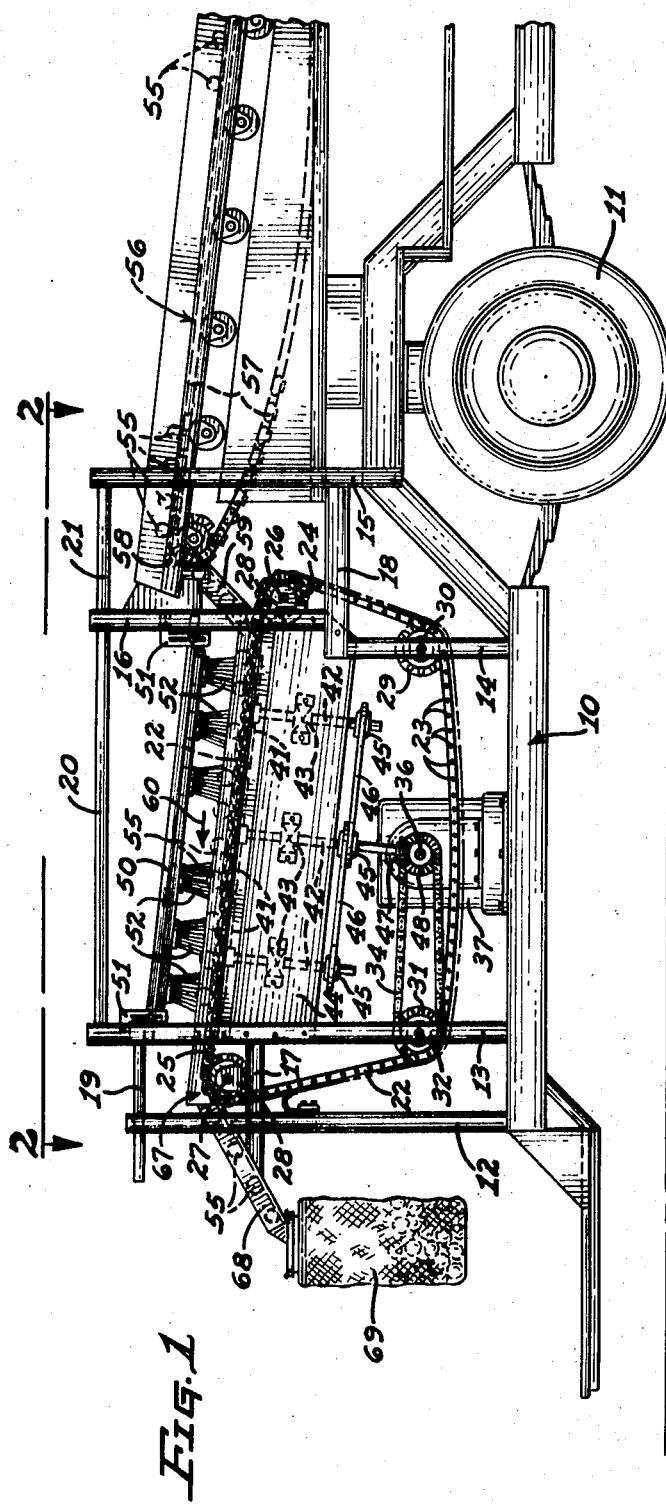

VEGETABLE PROCESSING MACHINE

BACKGROUND OF THE INVENTION

This invention pertains to vegetable processing machines, and is particularly directed to a machine for automatically and in a continuous manner trimming the tops and roots from vegetables such as onions and vegetable of similar characteristics.

Heretofore, it has been necessary to utilize a slow and costly hand labor process for removing the tops and roots of vegetables such as onions. This has resulted in an inferior final product lacking in uniformity and sales appeal.

SUMMARY OF THE INVENTION

One of the object of this invention is to provide a machine that automatically and continuously conveys onions and the like over a continuously moving grid in the presence of rapidly moving cutters to as to trim off the tops and roots in a rapid and efficient manner.

Another object is o roll the onions over a surface full of perforations so that the tops and roots can pass through the perforations to be cut off by cutting devices closely adjacent the openings.

And another object is to provide air movement over the onions to help suck the tops and roots down through the perforations into the cutting blades of the machine.

It is also an object to vibrate the perforated element of the machine to aid in settling the onions so that the tops and roots will be guided through the perforations.

A further object is to incline the path of travel of the onions to improve the behavior of the onions in presenting their tops and roots to the cutting elements.

BRIEF DESCRIPTION OF THE DRAWINGS

FIG. 1 is a fragmentary left-hand side elevation of a vegetable processing machine incorporating the features of this invention.

FIG. 2 is a fragmentary plan view of the machine shown in FIG. 1, indicated by the line 2—2 of that FIG. 1.

DESCRIPTION OF THE PREFERRED EMBODIMENT

Figure 3:
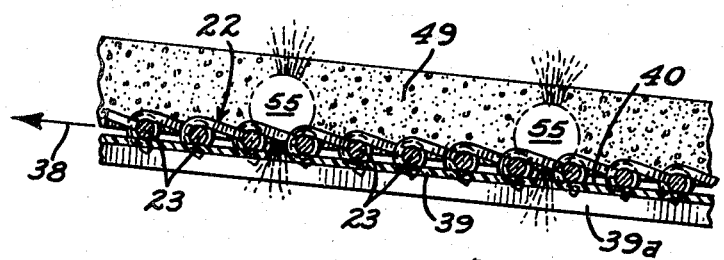
FIG. 3 is an enlarged fragmentary sectional view on the line 3—3 of FIG. 2.

As an example of one embodiment of this invention, there is shown an onion processing machine comprising a frame 10 which may be carried on road wheels 11 for portability. Upright columns 12, 13, 14 15 and 16 of the frame 10 are tied together by horizontal members 17, 18, 19, 20 and 21. An endless chain belt 22 having longitudinally spaced transverse bars 23 operates over idler sprockets 24 and 25 mounted on shafts 26 and 27 supported on bearings 28 carried on the frame members 16 and 17, and over the idler sprockets 29 on a shaft 30 journaled on suitable bearings in the frame members 14. The chain belt 22 is driven by the driving sprockets 31 fixed on the drive shaft 32 journaled in suitable bearings in the frame member 13. One end of the shaft 32 is provided with a sprocket 33 over which operates the drive chain 34 in turn connected to the sprocket 35 fixed to the motor shaft 36 of the main drive motor 37 carried on the frame 10.

The chain belt 22 is guided in an upwardly sloping path 38 between the sprockets 24 and 25 by laterally spaced antifriction strips 39 mounted on guide rails 39a on the upper surfaces 40 on which the outer ends of the transverse bars 23 slide. Closely adjacent the underside of the bars 23 are a series of rotary cutter knives 41 mounted on suitable spindles 42 journaled in bearings 43 suitably supported on a plate 44 fixed to the frame 10. All of the spindles 42 are connected to rotate together by pulleys 45 and belts 46, one of the spindles 42 having a bevel gear 47 which is driven by a bevel gear on the motor shaft 36. Adjacent each side of the chain belt 22, between the sprockets 24 and 25, are vertically disposed rubber friction pads 49.

Spaced above the chain belt is a rigid support plate 50 secured by suitable adjustable brackets 51 connected to the frame members 13 and 16. Brushes 52 have their backs 53 suitably secured to the underside 54 of the support plate 50 with the bristles projecting downwardly toward the chain belt 22.

Figure 4:
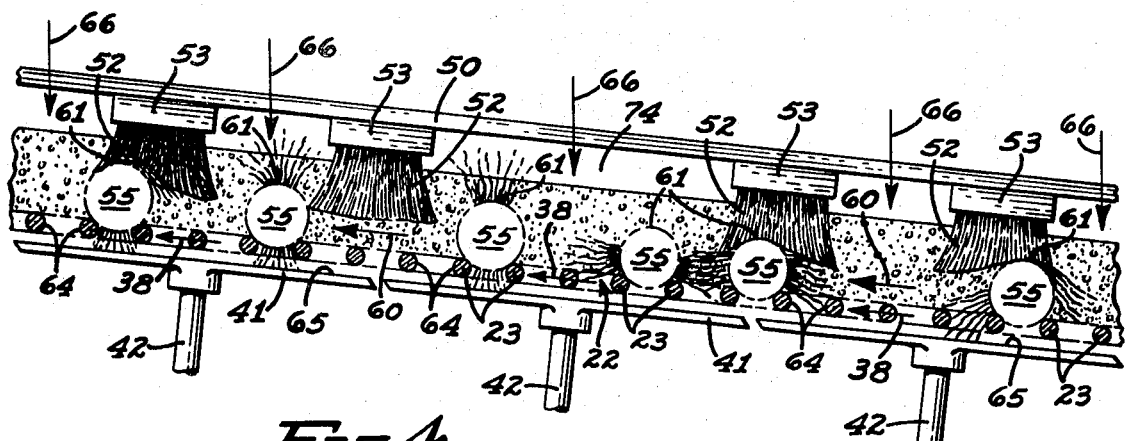
FIG. 4 is an enlarged fragmentary view on the line 4—4 of FIG. 2.
Figure 6:
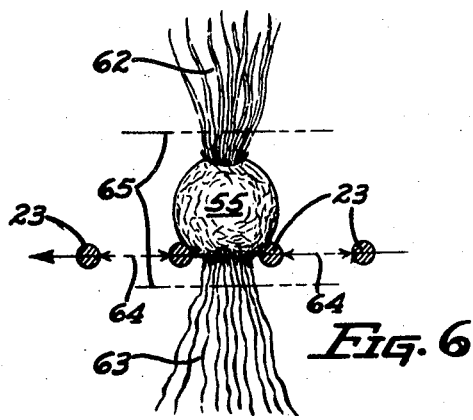
FIG. 6 is a greatly enlarged diagram showing the essential features of the process accomplished by the machine above described.

The vegetables to be processed such as the onions 55 are delivered to the chain belt 22 by a suitable feed conveyor 56 having a power driven feed belt 57 which discharges the onions at the point 58 onto a chute 59 which dumps them on the input end of the chain belt 22 adjacent the sprockets 24 to be carried along in the direction indicated by the arrows 60, with the onions being supported on the transverse bars 23, as shown in FIGS. 4 and 6. As the onions 55 are moved along in the direction 60 the brush bristles engage the upward facing portions 61 of the onions 55 so as to revolve and tumble the onions on the chain belt to expose the tops 62 and roots 63 down through the spaces 64 between the bars 23 so that the cutter knives 41 may trim off the tops and roots on the lines 65, FIG. 6.

The sponge rubber side friction pads 49 further aid in the tumbling and reorientation of the onions so as to expose the tops and roots to the cutting knives 41. It is also within the perview of this invention to provide a downwardly directed airblast in the direction of the arrows 66, to further enhance the above described operations.

After the treatment described, the onions discharge from the chain belt at point 67 onto a suitable discharge chute 68 and into a suitable packaging bag 69 for shipment.

Figure 5:
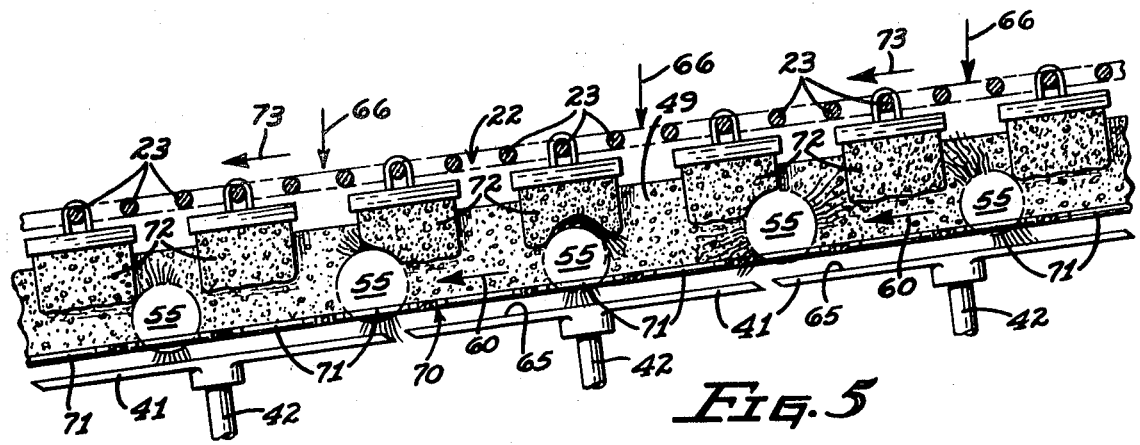
FIG. 5 is an enlarged fragmentary sectional view similar to FIG. 4, but showing a modification of the work handling apparatus of the machine.

FIG. 5 shows a modification of the above described apparatus in which there is provided a stationary screen 70 fixed to the frame 10 having spaces or perforations 71 similar to the spaces 64, FIG. 4, in the screen 70 being located immediately above the rotary cutter knives 41. The chain 22 is located above the screen 70 and the onions 55 and has sponge rubber blocks 72 suspended downwardly therefrom to engage the upwardly facing portions 61 of the onions 55. The screen 70 preferably slopes downwardly, to the left in FIG. 5, in the direction of travel 73 of the endless chain 22. In this arrangement the onions roll down the screen and are moved along and tumbled by the sponge rubber blocks draging over the onions so as to present the onions with their tops 62 and roots 63 projecting down into trimming position through the perforations 71 as in FIG. 4 arrangement.

Voids 74, FIG. 4, may be provided between groups of onion contacting and turning and tumbling devices 52 and 72, if desired to allow the onions to roll off its side and onto its top or bottom for more efficient presentation of the tops and roots for trimming by the rotary cutter knives.

I claim:
1. A vegetable processing machine comprising:
   A. a frame,
   B. a perforated work support on the frame having a vegetable engaging portion,
   C. a series of cutter knives on the frame located to define a trim line closely adjacent the vegetable engaging portion of the work support,
   D. and vegetable contacting devices on the frame movable relative to the vegetables on the work support to engage, rotate and tumble all the vegetables to present projections thereof to the cutter knives,
   E. said perforated work support defining an angularly positioned path having sides extending upwardly therefrom to form a trough, said sides defining a frictional surface facing each other to aid in the tumbling and reorientation of the vegetables.

2. A vegetable processing machine as in claim 1 wherein the vegetable contacting device comprising a plurality of work engaging devices (irregularly) spaced on the frame above the vegetables on the work support and engaging the opposite surfaces from the vegetable surfaces engaged by the perforated work support so as to turn and tumble the vegetables thereon.

3. A vegetable processing machine as in claim 1 in further combination with a plurality of airblast means mounted on said frame between said vegetable contacting devices for directing air under pressure toward said perforated work support for aiding in the rotating and tumbling of the vegetables.

* * * * *